June 7, 1955  S. B. WINN  2,710,201
AUTOMATICALLY-EXTENSIBLE TRAILER PROP
Filed April 25, 1950  2 Sheets-Sheet 1
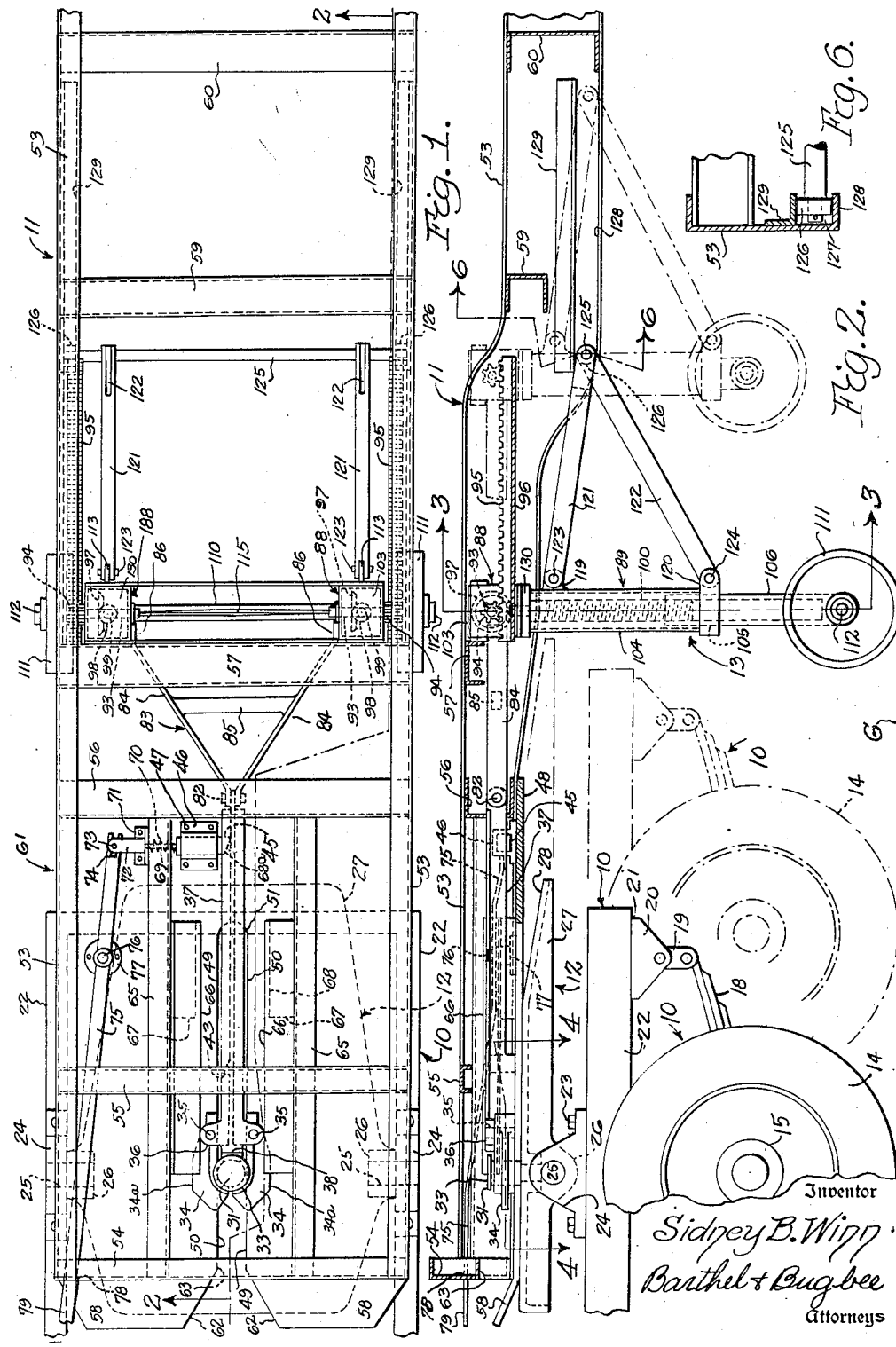
Inventor
Sidney B. Winn
Barthel & Bugbee
Attorneys June 7, 1955  S. B. WINN  2,710,201
AUTOMATICALLY-EXTENSIBLE TRAILER PROP
Filed April 25, 1950  2 Sheets-Sheet 2
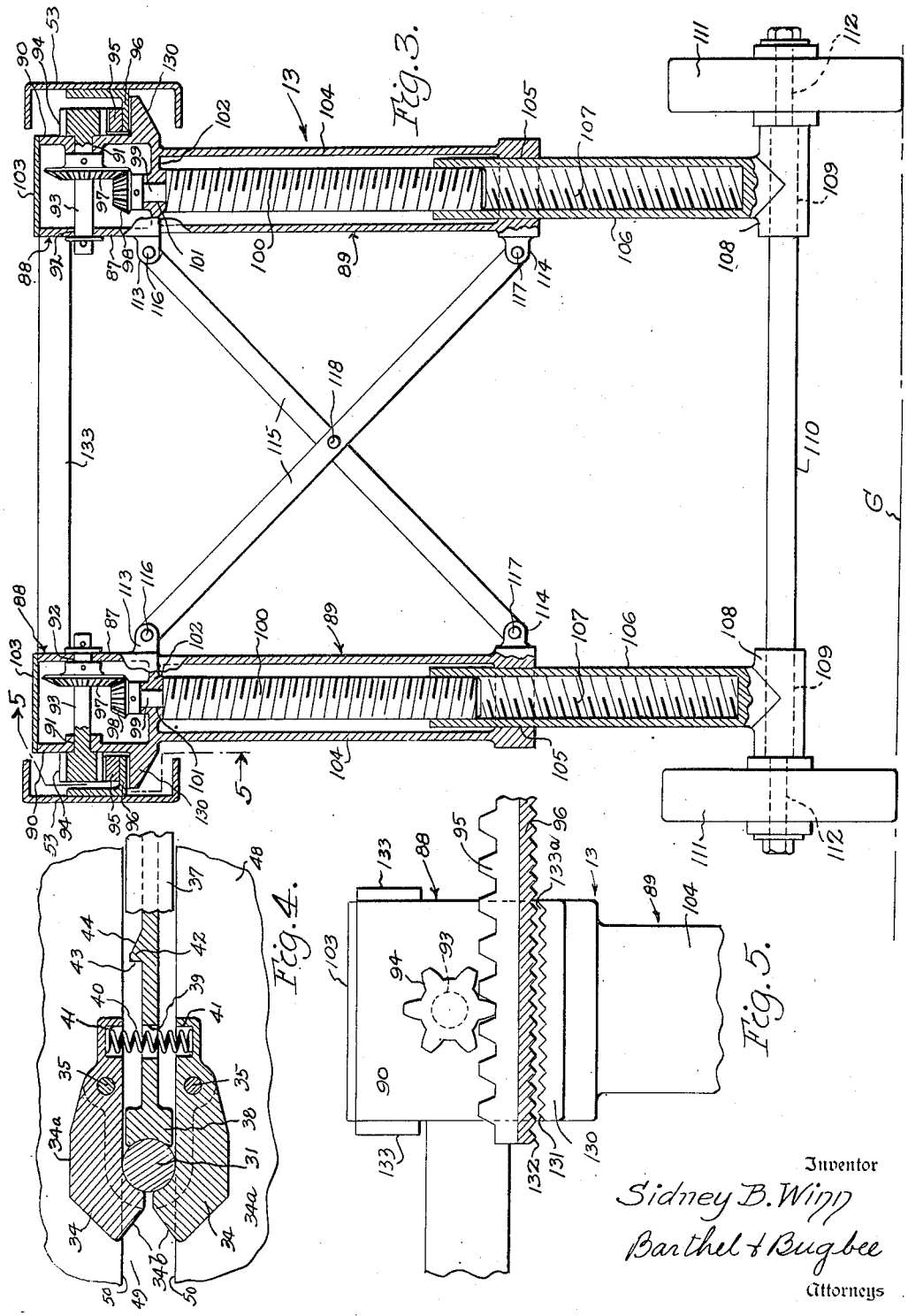
Inventor
Sidney B. Winn
Barthel & Bugbee
Attorneys United States Patent Office 2,710,201
Patented June 7, 1955

2,710,201
AUTOMATICALLY-EXTENSIBLE TRAILER PROP

Sidney B. Winn, Lapeer, Mich.

Application April 25, 1950, Serial No. 157,954

12 Claims. (Cl. 280—430)

This invention relates to tractor-trailer vehicles and, in particular, to trailer prop operating mechanisms.

One object of this invention is to provide an automatic trailer prop which is automatically lowered or protracted and moved bodily toward the forward end of the trailer in response to the uncoupling of the tractor from the trailer, and automatically retracted and moved rearwardly along the trailer in response to the coupling of the tractor to the trailer, so that the forward portion of the trailer is supported nearer its forward end than are prior trailers while the trailer is standing alone, uncoupled from the tractor, thereby preventing so-called "nose-diving" of the trailer.

Another object is to provide an automatic trailer prop which is connected by operating mechanism to the tractor-trailer coupling device in such a manner that as the kingpin of the coupling device pulls away from the coupling position to uncouple the vehicles, the previously-mentioned mechanism operates automatically not only to lower the prop but also to move it forward bodily toward the forward end of the tractor from the position which the prop occupies in its retracted position during travel.

Another object is to provide an automatically extensible trailer prop of the foregoing character wherein as the kingpin moves into the coupling position to couple the vehicles as the tractor backs toward the trailer, the previously mentioned mechanism operates automatically not only to raise or retract the prop to its travel position, but also to move the prop bodily in a rearward direction so as to remove it from a position where it might otherwise collide with portions of the tractor.

Another object is to provide an automatic trailer prop of the foregoing character wherein the prop carrier is provided with a locking arrangement which automatically prevents it from sliding rearwardly when the weight of the trailer is lowered upon it during the uncoupling operation, this locking arrangement preventing slipping during the resting or uncoupled status of the trailer, but permitting slipping the instant the load is removed by the coupling of the tractor to the trailer.

In the drawings:

Figure 1 is a top plan view of the forward portion of a trailer vehicle coupled to the rearward portion of a tractor vehicle by means of a so-called fifth wheel, with the trailer prop lowered or protracted to its trailer-supporting position, the retracted travelling position thereof being shown in dotted lines;

Figure 2 is a side elevation, partly in section, of the portions of the vehicle shown in Figure 1, with the parts thereof in the same positions;

Figure 3 is a vertical section taken along the line 3—3 in Figure 2, showing the prop raising and lowering mechanism;

Figure 4 is a horizontal section through the coupling jaws, king pin and adjacent mechanism, taken along the line 4—4 in Figure 2;

Figure 5 is an enlarged fragmentary side elevation, partly in vertical section, taken along the line 5—5 in Figure 3 and showing the prop locking arrangement; and Figure 6 is an enlarged fragmentary vertical section showing one of the guide rollers and its guideway for guiding the prop bracing structure in its forward and rearward travel between the positions shown in Figure 2.

Hitherto, in tractor-trailer vehicles, the trailer prop or landing gear of the trailer vehicle has been mounted a considerable distance back from the forward end of the trailer vehicle, because of the necessity of providing space for the so-called fifth wheel or coupling mechanism mounted on the rearward end of the tractor vehicle as well as for the tractor vehicle itself. When the trailer prop is mounted in this position, however, with the forward end of the trailer vehicle overhanging it, there is a tendency for the trailer vehicle to "nose dive" or plunge forward and downward when the trailer vehicle is uncoupled from the tractor vehicle. This nose-diving results in damage not only to the contents of the trailer vehicle but also to the vehicle itself. Furthermore, where it has been necessary for the driver or operator of the tractor-vehicle to lower the trailer prop before he uncoupled the trailer from the tractor, forgetfulness in doing so also caused the forward end of the trailer to drop to the ground on uncoupling, likewise damaging both the trailer vehicle and its contents.

The present invention provides an automatic trailer prop and operating mechanism therefor which not only makes it impossible for the operator to neglect to lower or protract the trailer prop before he uncouples the trailer vehicle from the tractor vehicle, but also automatically moves the prop bodily from a rearward and retracted traveling position to a forward and protracted resting or trailer supporting position in response to the uncoupling of the two vehicles. In such a position, the prop is located much nearer the forward end of the trailer vehicle than prior props, with a consequent reduction in the danger of "nose-diving."

Referring to the drawings in detail, Figures 1 and 2 show the rearward end of a tractor, generally designated 10, coupled to the forward end of a trailer, generally designated 11, through the action of a coupling device or fifth wheel, generally designated 12. The latter is operatively connected to the mechanism of an automatically-lowered and raised prop or landing gear, generally designated 13.

The tractor 10 is of any conventional type and its details form no part of the present invention. The rearward end of the tractor 10 is supported by the tires 14 of wheels 15 mounted upon an axle (no shown) secured to the mid-portions of leaf springs 18. The springs 18 are supported at their opposite ends by spring shackles 19 (Figure 2) which are carried by spring brackets 20 secured as at 21 to the tractor frame side members 22. Bolted as at 23 to the tops of the frame side members 22 are bearing or trunnion brackets 24 in which pivot shafts or trunnions 25 are pivotally mounted, these in turn being mounted in bracket portions 26 extending downward from a fifth wheel table or lower fifth wheel 27. By this means, the table 27 is rockably mounted on the tractor 10. The rearward end of the table 27 is inclined downward as at 28 to facilitate coupling and uncoupling.

Mounted in the center of the table 27 is the lower end of a king-pin or coupling pin 31. The king-pin 31 is flanged at its upper end 33. Engageable with the opposite sides of the king-pin 31 are two oppositely-facing coupling jaws 34 which are pivotally mounted on vertical pins 35 (Figures 1 and 4) mounted in the ends of a cross member 36 which in turn is located near the forward end of a reciprocating prop operating bar or operating member 37. A king-pin contacting portion or abutment 38 extends forward from the cross member 36 and engages the king-pin 31 when the jaws 34 are closed upon the king-pin 31.

The operating bar 37 is in the form of an I-beam and has a transverse hole 39 therein (Figure 4) through which passes a coil compression spring 40 having its opposite ends seated in the cupped portions 41 at the opposite ends of the coupling jaws 34 from the forward portions thereof which engage the king-pin 31. The operating bar 37 is also provided with a laterally-projecting stop 42 (Figure 4) which has a forwardly-facing abutment shoulder 43 and a rearwardly-facing inclined portion 44. Engageable with the abutment shoulder 43 is a locking bolt 45 which is slidably mounted in a bracket 46, the latter in turn being secured as at 47 to the fifth wheel plate or upper fifth wheel 48. The plate 48 is provided with a longitudinal slot 49 with opposite edges 50 for receiving the king-pin 31 (Figures 4 and 1). The slot 49 terminates at its rearward end in a shoulder 51 (Figure 1).

Secured to the plate 48 are the frame side members 53 (Figure 6) of the trailer 11, these being interconnected by cross members 54, 55, 56, 57, 59 and 60 (Figure 1). Bolted or riveted to the cross member 54 or integral therewith are upwardly and forwardly bent skids 58 which are inclined inwardly as at 62 toward a slot 63 through the frame member 54, this slot 63 being aligned with the slot 49. The skids 58 are so mounted in order to facilitate the engagement of the forward end of the trailer frame, generally designated 61, with the lower fifth wheel or table 27.

Likewise secured to the upper fifth wheel or plate 48 are spaced longitudinal channel members 65 and these in turn have spaced longitudinal angle members 66 secured thereto and forming a substantially horizontal longitudinal guideway (Figures 1 and 2). Secured to the angle members 66 are the guide bars 67, the inner edges 68 of which engage the outer edge portions 34a (Figure 4) of the coupling jaws 34, preventing the latter from opening and thereby uncoupling the king-pin 31 throughout the length of the guide bars 67 which extend only partway toward the forward cross member 54 of the trailer frame 61. The forward ends of the coupling jaws 34 are also beveled as at 34b to facilitate spreading of the jaws 34 in response to the entry of the king-pin 31.

One of the corners of the locking bolt 45 is beveled as at 68a (Figure 1) and its rearward end is provided with a rod 69 passing through a hole in one of the longitudinal channel members 65 (Figure 1) and is encircled by a coil spring 70. The coil spring 70 urges the bolt 45 into engagement with the operating bar 37 behind the abutment shoulder 43, and has its rearward end engaging an angle bracket 71 bolted or riveted to the plate 48. The rearward end of the rod 69 carries a clevis 72 with a pin 73 mounted therein and engaged by the slotted or forked end portion 74 of the actuating lever 75. The latter is pivoted as at 76 to the bracket 77 which in turn is secured to the plate 48 (Figure 1) The forward end of the lever 75 passes through a horizontal slot 78 in the frame cross member 54 (Figures 1 and 2) and has a handle portion 79 projecting forwardly therefrom.

The operating bar 37 extends rearwardly along the trailer frame 61 and at its rearward end is connected as at 82 to a prop-supporting structure, generally designated 83. The latter consists of a roughly triangular frame structure 84 (Figure 1) having outwardly diverging side bars 86 interconnected by a strut 85. The rearward ends of the side bars 86 are bent parallel to the side members 53 of the frame 61 and secured as by welding to the inner side walls 87 of gear boxes 88 forming the upper portions of trailer prop leg housings, generally designated 89 (Figure 3) and integral therewith. The outer wall 90 of each gear box 88 and the inner walls 87 thereof are bored as at 91 and 92 respectively to rotatably receive and journal a pair of shafts 93, the outer ends of which carry pinions 94 meshing with racks 95. The racks 95 are parallel to the frame side members 53 and are supported upon angle members 96 which are welded or otherwise secured to the inner surfaces of the webs of the trailer frame side members 53.

Mounted near the inner end of each shaft 93 and pinned or otherwise drivingly connected thereto a bevel gear 97 which meshes with a bevel pinion 98 mounted on and drivingly secured to the reduced diameter upper end portion 99 of a screw shaft 100. Each reduced diameter portion 99 is journaled in a bore 101 in the bottom wall 102 of each gear box 88, the remaining wall 103 being in the form of a cover plate which is removable in order to obtain access to the gears 97 and 98. The two screw shafts 100 are mounted in downwardly-extending tubular portions 104 (Figure 3), each forming a part of the leg housing 89. The lower end of each tubular portion 104 is bored as at 105 to slidably receive the tubular leg 106. Each tubular leg 106 is internally threaded as at 107 to receive its respective screw shaft 100, the rotation of which causes the leg 106 to move upward or downward, depending on the direction of rotation. Each tubular leg 106 carries at its lower end an axle housing 108 which is bored as at 109 to receive an axle 110 having wheels 111 mounted on the reduced diameter portions 112 thereof outwardly of the axle housing 109. Each of the tubular portions 104 of the housings 89 is provided with upper and lower lateral ears 113 and 114 respectively (Figure 3) to which are pivotally attached the upper and lower ends of cross braces 115, as at 116 and 117 respectively, the cross braces 115 being connected to one another at 118, their crossing point.

Each tubular portion 104 of the leg housings 89 is also provided with upper and lower longitudinal ears 119 and 120 respectively to which the forward ends of longitudinal braces 121 and 122 are pivotally attached, as at 123 and 124 respectively. The braces 121 at their rearward ends are bifurcated to receive the upper ends of the braces 122, and both are bored at their rearward ends to receive the cross shaft 125, the outer ends of which carry rollers 126. Each of the rollers 126 travels in a guideway 127 formed by the lower flange 128 of the frame side member 53 (Figures 2 and 6) and an angle member 129 which is welded or otherwise secured to the inside surface of the frame side member 53 in vertically spaced relationship to the flange 128.

In order to prevent possible slippage of the prop 13, each of the outer walls 90 of the gear boxes 88 is provided with an outwardly extending ledge or shelf 130 provided with serrations 131 which engage corresponding serrations 132 upon the lower surface of the angle member 96. The serrations 131 are normally spaced away from the serrations 132 by a clearance space 133a sufficient to cause the serrations to clear one another while the prop 13 slides horizontally and while the prop 13 is hanging freely out of contact with the ground (Figure 5). When, however, the prop 13 hits the ground, it halts while the trailer body, frame side members 53 and angle members 96 continue to descend, engaging the serrations 131 and 132 and preventing lateral slippage until the trailer is again coupled. The gear boxes 88 are tied together by cross bars 133 welded or otherwise secured thereto.

*Operation*

In the operation of the invention, let it be assumed that the tractor 10 is fully coupled to the trailer 11 in the dotted line position of Figure 2, with the coupling jaws 34 moved rearwardly so that the locking bolt 45 is engaging the shoulder 43 on the operating bar 37 (Figures 1 and 4). To uncouple the tractor 10 from the trailer 11, the operator shifts the lever 75 to withdraw the bolt 45, and then drives the tractor 10 forward, carrying with it the kingpin 31, the jaws 34, and the operating bar 37, pulling the prop 13 forward from the dotted line position to the solid line position of Figure 2, its pinions rolling on the racks 95 and consequently rotating the screw shafts 100 to lower the internally threaded legs 106 of the prop 13. If the wheels 111 do not encounter a hummock in the ground, they move downward to their lowermost positions and halt short of the ground. At that time, or earlier if the wheels 111 meet a hummock, the kingpin 31 pulls the jaws 34 apart by overcoming the thrust of the spring 40 (Figure 4). Further motion of the tractor 10 causes the skids 58 at the forward end of the trailer 11 to slide downward along the inclined surface 28 of the lower fifth wheel 27 (Figure 2), permitting the wheels 111 of the prop 13 to hit the ground, and the serrations 132 on the lower portion of each angle member 96 (Figures 3 and 5) engage the serrations 131 on the ledge 130 of each upper gear box 88 of the prop 13, preventing slippage thereof. The trailer is now firmly supported near its forward end, without any danger of "nose-diving", and the tractor 10, now disconnected, is free to move away.

To recouple the tractor 10 with the trailer 11, the operator backs the tractor 10 carefully toward the trailer 11 so that the kingpin 31 enters the slots 63 and 49, the latter being in the upper fifth wheel or plate 48. The king-pin engages the beveled end portions 34b of the coupling jaws 34 (Figure 4), spreading them apart and halting behind them in engagement with the abutment 38. The jaws 34 are closed behind the king-pin 31 by the coil spring 40, and the backing motion of the trailer 10 by reason of the engagement of the king-pin 31 with the abutment 38 pushes the operating bar 37 rearwardly. As the edge portions 34a of the coupling jaws 34 enter the space between the guide bars 67, they engage the inner edges 68 thereof and are thereby prevented from moving outward. Accordingly, the king-pin 31 is now securely locked in engagement with the jaws 34. As the inclined portion 44 of the stop 42 moves past the end of the bolt 45, it pushes the latter outward, whereupon the spring 70 immediately pushes the bolt 45 inward into locking position behind the shoulder 43 when the stop portion 42 has passed by.

In the meantime, as the operating bar 37 has been moved rearward by its engagement with the king-pin 31, it likewise pushes the frame structure 83 and prop 13 rearward from the solid line position of Figure 2 to the dotted line position therein. As the prop 13 travels rearwardly, the rollers 126 guide it by their engagement with the guideways 127 (Figure 2). As the prop 13 moves rearwardly, the gear boxes 88 are carried along with it, causing the pinions 94 to roll along the racks 95. This action rotates the shaft 93, bevel gears 97 and 98 and screw shafts 100. The rotation of the screw shafts 100 and the engagement of their threaded portions 101 with the threaded portions 107 of the tubular legs 106 causes the legs 106 to rise, lifting the wheels 111 upward into the dotted line position shown in Figure 2. Thus, as the trailer 10 reaches the dotted line position shown in Figure 2, the prop 13 reaches the dotted line retracted position shown in Figure 2, and the tractor-trailer vehicle combination is ready for travel.

It will be evident from the drawings that in place of the pair of laterally-spaced racks 95 operating the gearing 94, 97, 98 (Figure 3), a single rack 95 can also be used to operate this gearing provided only that the shafts 93 were interconnected. The pair of racks 95 is preferred because these racks and the pinions 94 rolling on them serve to support the forward end of the prop 13 during the raising and lowering operation while the rearward end is supported by the rollers 126 in the guideways 127.

What I claim is:

1. An automatically-extensible trailer prop device for a tractor-trailer combination with interlocking unitarily-reciprocable coupling elements, said prop device comprising a substantially horizontal longitudinal guideway mounted forwardly on the trailer, a horizontally-reciprocable prop-supporting structure mounted for horizontal travel along said horizontal guideway between a rearward traveling position and a forward trailer-supporting position and having a vertical prop guideway mounted thereon, a vertical prop reciprocably mounted in said vertical guideway for vertical reciprocation therein between a raised traveling position and a lowered trailer-supporting position, prop raising-and-lowering mechanism disposed between said prop and said prop-supporting structure and operatively interconnecting the same, and a prop-operating member reciprocably mounted on said trailer and operatively connecting one of said reciprocable coupling elements to said prop-supporting structure, said mechanism including a stationary machine element secured to said trailer and a movable machine element mounted on said prop-supporting structure and operatively engaging said stationary machine element, said elements being responsive to the motion of said operating member and said prop-supporting structure forwardly along said guideway for simultaneously moving said prop vertically downward in a prop-lowering direction.

2. An automatically-extensible trailer prop device for a tractor-trailer combination with interlocking unitarily-reciprocable coupling elements, said prop device comprising a substantially horizontal longitudinal guideway mounted forwardly on the trailer, a horizontally-reciprocable prop-supporting structure mounted for horizontal travel along said horizontal guideway between a rearward traveling position and a forward trailer-supporting position and having a vertical prop guideway mounted thereon, a vertical prop reciprocably mounted in said vertical guideway for vertical reciprocation therein between a raised traveling position and a lowered trailer-supporting position, prop raising-and-lowering mechanism disposed between said prop and said prop-supporting structure and operatively interconnecting the same, and a prop-operating member reciprocably mounted on said trailer and operatively connecting one of said reciprocable coupling elements to said prop-supporting structure, said mechanism including a stationary machine element secured to said trailer and a movable machine element mounted on said prop-supporting structure and operatively engaging said stationary machine element, said elements being responsive to the motion of said operating member and said prop-supporting structure forwardly along said guideway for simultaneously moving said prop vertically downward in a prop-lowering direction, said elements being responsive to the motion of said operating member and said prop-supporting structure rearwardly along said guideway for moving said prop vertically upward in a prop-raising direction.

3. An automatically-extensible trailer prop device for a tractor-trailer combination with interlocking unitarily-reciprocable coupling elements, said prop device comprising a substantially horizontal longitudinal guideway mounted forwardly on the trailer, a horizontally-reciprocable prop-supporting structure mounted for horizontal travel along said horizontal guideway between a rearward traveling position and a forward trailer-supporting position and having a vertical prop guideway mounted thereon, a vertical prop reciprocably mounted in said vertical guideway for vertical reciprocation therein between a raised traveling position and a lowered trailer-supporting position, prop-raising-and-lowering mechanism disposed between said prop and said prop-supporting structure and operatively interconnecting the same, and a prop-operating member reciprocably mounted on said trailer and operatively connecting one of said reciprocable coupling elements to said prop-supporting structure, said mechanism including a stationary machine element secured to said trailer and a movable machine element mounted on said prop-supporting structure and operatively engaging said stationary machine element, one of said machine elements comprising a rack mounted on said trailer and the other machine element comprising gearing on said prop-supporting structure meshing with said rack, said rack and gearing being responsive to the motion of said operating member and said prop-supporting structure forwardly along said guideway for simultaneously moving said prop vertically downward in a prop-lowering direction.

4. An automatically-extensible trailer prop device for a tractor-trailer combination with interlocking unitarily-reciprocable coupling elements, said prop device comprising a substantially horizontal longitudinal guideway mounted forwardly on the trailer, a horizontally-reciprocable prop-supporting structure mounted for horizontal travel along said horizontal guideway between a rearward traveling position and a forward trailer-supporting position and having a vertical prop guideway mounted thereon, a vertical prop reciprocably mounted in said vertical guideway for vertical reciprocation therein between a raised traveling position and a lowered trailer-supporting position, prop-raising-and-lowering mechanism disposed between said prop and said prop-supporting structure and operatively interconnecting the same, and a prop-operating member reciprocably mounted on said trailer and operatively connecting one of said reciprocable coupling elements to said prop-supporting structure, said mechanism including a stationary machine element secured to said trailer and a movable machine element mounted on said prop-supporting structure and operatively engaging said stationary machine element, one of said machine elements comprising a rack mounted on said trailer and the other machine element comprising gearing on said prop-supporting structure meshing with said rack, said rack and gearing being responsive to the motion of said operating member and said prop-supporting structure forwardly along said guideway for simultaneously moving said prop vertically downward in a prop-lowering direction, said rack and gearing being also responsive to the motion of said operating member and said prop-supporting structure rearwardly along said guideway for simultaneously moving said prop vertically upward in a prop-raising direction.

5. An automatically-extensible trailer prop device for a tractor-trailer combination with interlocking unitarily-reciprocable coupling elements, said prop device comprising a substantially horizontal longitudinal guideway mounted forwardly on the trailer, a horizontally-reciprocable prop-supporting structure mounted for horizontal travel along said horizontal guideway between a rearward traveling position and a forward trailer-supporting position and having a vertical prop guideway mounted thereon, a vertical prop reciprocably mounted in said vertical guideway for vertical reciprocation therein between a raised traveling position and a lowered trailer-supporting position, prop raising-and-lowering mechanism disposed between said prop and said prop-supporting structure and operatively interconnecting the same, a prop-operating member reciprocably mounted on said trailer and operatively connecting one of said reciprocable coupling elements to said prop-supporting structure, said mechanism including a stationary machine element secured to said trailer and a movable machine element mounted on said prop-supporting structure and operatively engaging said stationary machine element, said elements being responsive to the motion of said operating member and said prop-supporting structure forwardly along said guideway for simultaneously moving said prop vertically downward in a prop-lowering direction, and interengaging locking serrations disposed on said prop-supporting structure and trailer respectively, said locking serrations being movable into mutual interlocking engagement in response to the engagement of the prop with the ground.

6. An automatically-extensible trailer prop device for a tractor-trailer combination with interlocking unitarily-reciprocable coupling elements, said prop device comprising a substantially horizontal longitudinal guideway mounted forwardly on the trailer, a horizontally-reciprocable prop-supporting structure mounted for horizontal travel along said horizontal guideway between a rearward traveling position and a forward trailer-supporting position, a vertically-reciprocable prop mounted on said prop-supporting structure for substantially-vertical motion between a raised traveling position and a lowered trailer-supporting position, prop raising-and-lowering mechanism disposed between said prop and said prop-supporting structure and operatively interconnecting the same, a prop operating member reciprocably mounted on said trailer and operatively connecting one of said reciprocable coupling elements to said prop supporting structure, said mechanism including a stationary machine element secured to said trailer and a movable machine element mounted on said prop-supporting structure and operatively engaging said stationary machine element, said elements being responsive to the motion of said operating member and said prop-supporting structure forwardly along said guideway for simultaneously moving said prop vertically downward in a prop-lowering direction, and interengaging locking serrations comprising mutually interengaging projections and depressions disposed on said prop-supporting structure and said trailer respectively, said locking serrations being movable into mutual interlocking engagement in response to the engagement of the prop with the ground.

7. An automatically-extensible trailer prop device for a tractor-trailer combination with interlocking unitarily-reciprocable coupling elements, said prop device comprising a substantially horizontal longitudinal guideway mounted forwardly on the trailer, a horizontally-reciprocable prop-supporting structure mounted for horizontal travel along said horizontal guideway between a rearward traveling position and a forward trailer-supporting position and having a vertical prop guideway mounted thereon, a vertical prop reciprocably mounted in said vertical guideway for vertical reciprocation therein between a raised traveling position and a lowered trailer-supporting position, prop-raising-and-lowering mechanism disposed between said prop and said prop-supporting structure and operatively interconnecting the same, and a prop-operating member reciprocably mounted on said trailer and operatively connecting one of said reciprocable coupling elements to said prop-supporting structure, said mechanism including a stationary machine element secured to said trailer and a movable machine element mounted on said prop-supporting structure and operatively engaging said stationary machine element, one of said machine elements comprising a rack mounted on said trailer and the other machine element comprising gearing on said prop-supporting structure meshing with said rack, said rack and gearing being responsive to the motion of said operating member and said prop-supporting structure forwardly along said guideway for simultaneously moving said prop vertically downward in a prop-lowering direction, said rack and gearing being spaced apart from said guideway and said prop-supporting structure having a bracing structure extending from said gearing into engagement with a portion of said trailer adjacent said guideway.

8. An automatically-extensible trailer prop device for a tractor-trailer combination with interlocking unitarily-reciprocable coupling elements, said prop device comprising a substantially horizontal longitudinal guideway mounted forwardly on the trailer, a horizontally-reciprocable prop-supporting structure mounted for horizontal travel along said horizontal guideway between a rearward traveling position and a forward trailer-supporting position and having a vertical prop guideway mounted thereon, a vertical prop reciprocably mounted in said vertical guideway for vertical reciprocation therein between a raised traveling position and a lowered trailer-supporting position, prop-raising-and-lowering mechanism disposed between said prop and said prop-supporting structure and operatively interconnecting the same, and a prop-operating member reciprocably mounted on said trailer and operatively connecting one of said reciprocable coupling elements to said prop-supporting structure, said mechanism including a stationary machine element secured to said trailer and a movable machine element mounted on said prop-supporting structure and operatively engaging said stationary machine element, one of said machine elements comprising a rack mounted on said trailer and the other machine element comprising gearing on said prop-supporting structure meshing with said rack, said rack and gearing being responsive to the motion of said operating member and said prop-supporting structure forwardly along said guideway for simultaneously moving said prop vertically downward in a prop-lowering direction, said rack and gearing being spaced apart from said guideway and said prop-supporting structure having a bracing structure extending from said gearing into engagement with a portion of said trailer adjacent said guideway, said bracing structure having a rotary guide element thereon guidingly engaging said guideway.

9. An automatically-extensible trailer prop device for a tractor-trailer combination with interlocking unitarily reciprocable coupling elements, said prop device comprising a pair of racks mounted in laterally-spaced relationship on the trailer, a pair of substantially horizontal guideways also mounted in laterally-spaced relationship on the trailer apart from said racks, a horizontally reciprocable prop-supporting structure disposed adjoining said racks, a pinion shaft journaled in each structure, a pinion drivingly secured on each pinion shaft and meshing with its respective rack, a pair of vertical screw shafts rotatably mounted in said prop-supporting structure, gearing drivingly connecting said screw shafts to said pinion shafts, a prop having threaded uprights threadedly engaging said screw shafts, said uprights being slidably mounted for vertical reciprocation in said prop supporting structure, and an elongated prop operating member reciprocably mounted on said trailer and operatively connecting one of said reciprocable coupling elements with said prop-supporting structure.

10. An automatically-extensible trailer prop device for a tractor-trailer combination with interlocking unitarily reciprocable coupling elements, said prop device comprising a pair of racks mounted in laterally-spaced relationship on the trailer, a pair of substantially horizontal guideways also mounted in laterally-spaced relationship on the trailer apart from said racks, a horizontally reciprocable prop-supporting structure disposed adjoining said racks, a pinion shaft journaled in each structure, a pinion drivingly secured on each pinion shaft and meshing with its respective rack, a pair of vertical screw shafts rotatably mounted in said prop-supporting structure, gearing drivingly connecting said screw shafts to said pinion shafts, a prop having threaded uprights threadedly engaging said screw shafts, said uprights being slidably mounted for vertical reciprocation in said prop supporting structure, an elongated prop operating member reciprocably mounted on said trailer and operatively connecting one of said reciprocable coupling elements with said prop-supporting structure, a projecting portion extending laterally from each side of said prop-supporting structure and having a serrated portion thereon, and a stationary member on each side of said trailer disposed adjacent the respective projecting portion and having serrations lockingly engageable therewith in the lowered trailer-supporting position of said prop.

11. An automatically-extensible trailer prop device for a tractor-trailer combination with interlocking unitarily reciprocable coupling elements, said prop device comprising a pair of racks mounted in laterally-spaced relationship on the trailer, a pair of substantially horizontal guideways also mounted in laterally-spaced relationship on the trailer apart from said racks, a horizontally reciprocable prop-supporting structure having a pair of laterally-spaced vertically-disposed bores adjoining said racks, a pinion shaft journaled in said structure, a pinion drivingly secured on each shaft meshing with its respective rack, a pair of vertical screw shafts rotatably mounted in said prop supporting structure, gearing drivingly connecting said screw shafts to said pinion shafts, a prop having threaded uprights threadedly engaging said screw shafts, said uprights being slidably mounted for vertical reciprocation in said bores, and an elongated prop operating member reciprocably mounted on said trailer and operatively connecting one of said reciprocable coupling elements with said prop-supporting structure.

12. An automatically-extensible trailer prop device for a tractor-trailer combination with interlocking unitarily-reciprocable coupling elements, said prop device comprising a pair of racks mounted in laterally-spaced relationship on the trailer, a pair of substantially horizontal guideways also mounted in laterally-spaced relationship on the trailer apart from said racks, a horizontally-reciprocable prop-supporting structure disposed adjoining said racks, a pinion shaft assembly journaled in said structure, a pair of laterally-spaced pinions drivingly secured on said shaft assembly adjacent said racks, each pinion meshing with its respective rack, a pair of vertical screw shafts rotatably mounted in said prop-supporting structure, gearing drivingly connecting said screw shafts to said pinion shafts, a prop having threaded uprights entering said housing and threadedly engaging said screw shafts, said prop-supporting structure including braces extending to said guideways and having guide elements engaging said guideways, and an elongated prop-operating member reciprocably mounted on said trailer and operatively connecting one of said reciprocable coupling elements with said prop-supporting structure.

References Cited in the file of this patent

UNITED STATES PATENTS

| | | |
|---|---|---|
| 1,373,431 | Johnson | Apr. 25, 1921 |
| 1,976,979 | Allen | Oct. 16, 1934 |
| 1,997,095 | Allen | Apr. 9, 1935 |
| 2,232,187 | Reid | Feb. 18, 1941 |
| 2,277,179 | Winn | Mar. 24, 1942 |

FOREIGN PATENTS

| | | |
|---|---|---|
| 556,357 | Germany | Aug. 23, 1942 |